United States Patent [19]
Notaro

[11] Patent Number: 5,324,148
[45] Date of Patent: Jun. 28, 1994

[54] TWO-PIECE LUG BOLT

[75] Inventor: David F. Notaro, Amherst, N.Y.

[73] Assignee: McGard, Inc., Orchard Park, N.Y.

[21] Appl. No.: 85,325

[22] Filed: Jun. 30, 1993

[51] Int. Cl.[5] .................. F16B 23/00; F16B 35/06
[52] U.S. Cl. ........................ 411/396; 411/373; 411/431; 411/919
[58] Field of Search .......... 411/372, 373, 375, 376, 411/429, 430, 431, 396, 397, 919, 383

[56] References Cited

U.S. PATENT DOCUMENTS

| | | | |
|---|---|---|---|
| 2,503,189 | 4/1950 | Biba, Jr. ................... | 411/396 X |
| 4,460,300 | 7/1984 | Bettini et al. .............. | 411/375 |
| 4,759,672 | 7/1988 | Nilsen et al. .............. | 411/375 |
| 4,764,070 | 8/1988 | Baltzell et al. ............. | 411/375 X |
| 4,955,773 | 9/1990 | Toth .......................... | 411/376 X |

FOREIGN PATENT DOCUMENTS

| | | | |
|---|---|---|---|
| 1512400 | 2/1968 | France ..................... | 411/396 |
| 1119864 | 7/1968 | United Kingdom ....... | 411/397 |

OTHER PUBLICATIONS

FIGS. 1, 2 and 3 of the drawings of the instant patent application Ser. No. 08/085,325.

Primary Examiner—Neill R. Wilson
Attorney, Agent, or Firm—Joseph P. Gastel

[57] ABSTRACT

A two-piece lug bolt including a shank having first and second end portions and a central portion therebetween, a thread on the first end portion, a first flange of larger diameter than both the first and second end portions located on the central portion of the shank, a head, a wrench-receiving portion on the head for receiving a wrench, a bore in the head for receiving the second end portion of the shank with a press-fit and a second flange on the head which is of larger diameter than the wrench-receiving portion and substantially the same diameter as the first flange located in contiguous relationship to the first flange and in bearing relationship therewith.

12 Claims, 1 Drawing Sheet

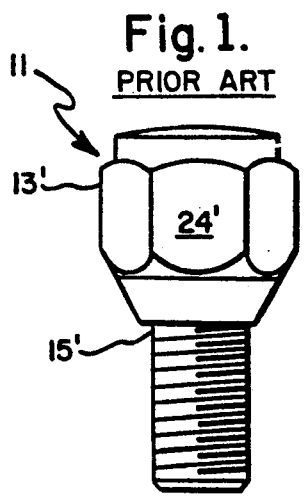
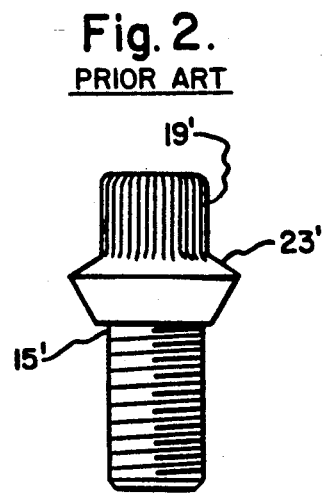
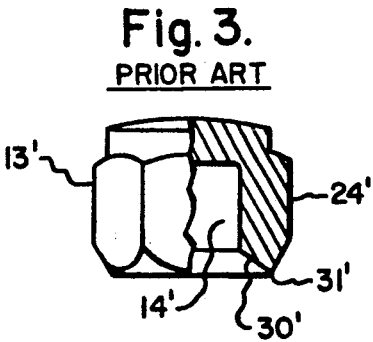
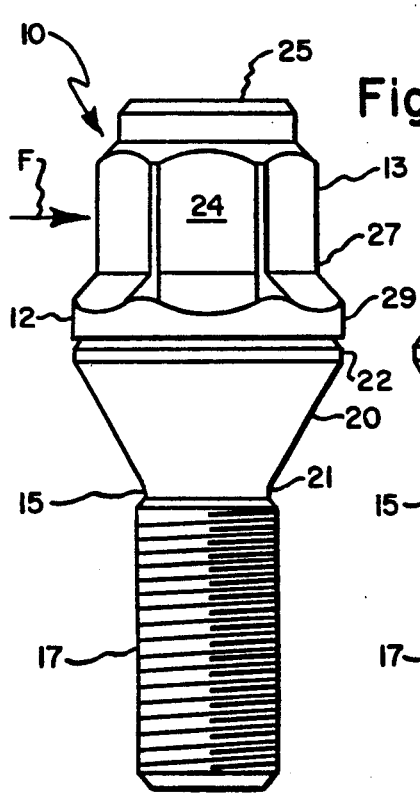
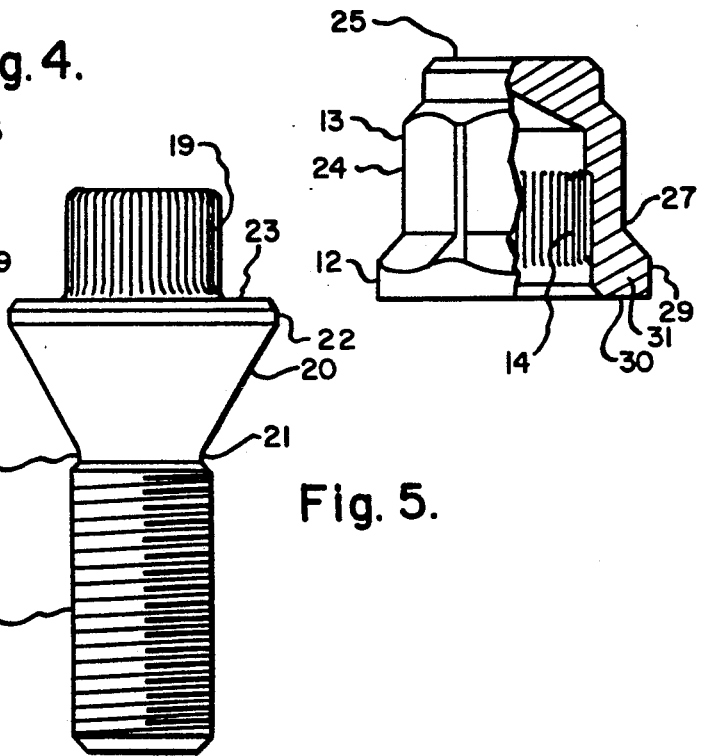
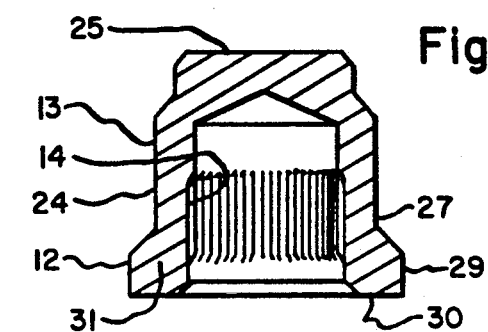
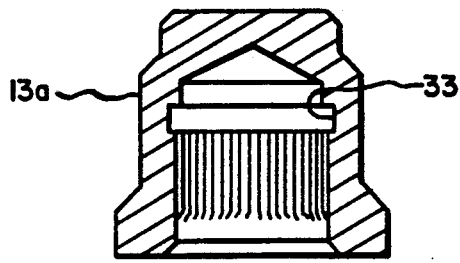

TWO-PIECE LUG BOLT

BACKGROUND OF THE INVENTION

The present invention relates to an improved two-piece lug bolt.

In the past, two-piece lug bolts have been fabricated for the purpose of permitting the head to be made of a different material than the remainder of the shank. One embodiment of a prior two-piece lug bolt is disclosed in the drawings accompanying the present specification, and the manner in which the improved lug bolt of the present invention is superior is discussed hereafter.

SUMMARY OF THE INVENTION

It is one object of the present invention to provide an improved two-piece lug bolt which has greater stability against lateral forces applied to the head thereof than prior two-piece lug bolts.

Another object of the present invention is to provide an improved two-piece lug bolt wherein the bore in the head and the head-receiving portion of the shank are both knurled to provide a uniform and evenly distributed press-fit therebetween. Other objects and attendant advantages of the present invention will readily be perceived hereafter.

The present invention relates to a two-piece lug bolt comprising a shank having first and second end portions and a central portion therebetween, a thread on said first end portion, a first flange of larger diameter than both said first and second end portions located on said central portion of said shank, a head, a wrench-receiving portion on said head for receiving a wrench, a bore in said head for receiving said second end portion with a press fit, and a second flange on said head, said second flange being of larger diameter than said wrench-receiving portion and located in contiguous relationship to said first flange.

The various aspects of the present invention will be more fully understood when the following portions of the specification are read in conjunction with the accompanying drawings wherein:

BRIEF DESCRIPTION OF THE DRAWINGS

FIG. 1 is a side elevational view of a prior art two-piece lug bolt;

FIG. 2 is a side elevational view of the shank of the prior art lug bolt;

FIG. 3 is a fragmentary side elevational view of the head of the two-piece prior art lug bolt;

FIG. 4 is a side elevational view of the improved two-piece lug bolt of the present invention;

FIG. 5 is a side elevational view of the shank of the lug bolt of FIG. 4;

FIG. 6 is a fragmentary side elevational view of the head of the lug bolt of FIG. 4;

FIG. 7 is a cross sectional view of the head of the lug bolt of FIG. 4; and

FIG. 8 is a cross sectional view of a modified form of head which can be used on the lug bolt of FIG. 4.

DESCRIPTION OF THE PREFERRED EMBODIMENTS

The advantages of the improved two-piece lug bolt 10 of the present invention will be more fully appreciated when it is compared to the prior lug bolt 11 of FIG. 1. Summarizing in advance, the improvement consists of a flange 12 on the head 13 and a knurl 14 in the head. The flange 12, as more fully discussed hereafter, stabilizes the head against splitting and cocking when a lateral force, as depicted by arrow F, is applied thereto.

The improved two-piece lug bolt 10 includes a shank 15 having a threaded end portion 17, a knurled end portion 19, and a flange 20 therebetween. Flange 20 is shown as being frustoconical, but it may be spherical or of any other configuration for providing a bearing surface against a body such as a vehicle rim. The smaller base 21 of flange 20 is adjacent the threaded end portion 17, and the larger base 22 of flange 20 is adjacent knurled end portion 19. Base 22 terminates at an annular flat surface 23. The head 13 has a hexagonal wrench-receiving portion 24 and a substantially cylindrical crown 25. Flange 12 of head 13 flares outwardly from the end 27 of wrench-receiving portion 24 and terminates at a substantially cylindrical portion 29 which has a substantially annular planar surface 30 thereon.

During the assembling of head 13 onto shank 15, the knurled portion 14 of head 13 intermeshes with knurled end portion 19 of shank 15 to provide a uniform and evenly distributed press-fit therebetween. The existence of knurls on both parts also obviates the shaving of an inner portion of head 13, which would occur if the inner portion, such as 14' of prior art head 13', is not knurled as it is placed on knurled end portion 19' of prior art shank 15'. The fact that a nonknurled head, such as 13', is placed on a knurled portion, such as 19', does cause shaving, which is undesirable.

When head 13 is fully seated on knurled end portion 19, flat annular surface 30 of head 13 will bear against flat annular surface 23 of flange 20. This bearing relationship stabilizes head 13 against cocking resulting from lateral forces, such as F, applied to head 13. This relationship is not capable of achievement in the prior art two-piece lug bolt 11 which does not have the additional flange 12 of head 13. Furthermore, it can be seen that the flange 12 has a thickened area at 31 whereas the base of prior art head 13' does not have this. In contrast, the base 30' of prior head 13' comes to a point at 31' so that there is more of a possibility of head 13' splitting when lateral forces, such as F, are applied to head 13'. Furthermore, the annular surfaces 30' or prior art head 13' bears against frustoconical surface 23' of shank 15'. However, this bearing area lies entirely radially within the wrench-receiving portion 24' of head 13' whereas in the device of FIGS. 4–7, a portion of the bearing area between portions 23 and 30 lies radially outwardly of the wrench-receiving portion 24, and thus this configuration provides greater resistance to lateral displacement of head 13 when subjected to side forces such as F.

In FIG. 8 a modified head 13a is shown which is identical in all respects to head 13 except that it is machined whereas head 13 is cold-headed. Head 13a contains an annular groove 33 therein. Otherwise, it is identical to head 13.

It can thus be seen that the improved two-piece lug bolt of the present invention is manifestly capable of achieving the above enumerated objects, and while preferred embodiments of the present invention have been disclosed, it will be appreciated that it is not limited thereto but may be otherwise embodied within the scope of the following claims.

What is claimed is:

1. A two-piece lug bolt comprising a shank having first and second end portions and a central portion therebetween, a thread on said first end portion, a first flange of larger diameter than both said first and second end portions located on said central portion of said shank, a head, a wrench-receiving portion on said head for receiving a wrench, a bore in said head for receiving said second end portion with a press fit, a second flange on said head, said second flange being of larger diameter than said wrench-receiving portion and located in contiguous relationship to said first flange, said first flange being frustoconical and having a smaller base adjacent said first portion of said shank, and said second flange flaring outwardly from said wrench-receiving portion toward said first flange, and said first and second flanges having substantially the same maximum diameter.

2. A two-piece lug bolt comprising a shank having first and second end portions and a central portion therebetween, a thread on said first end portion, a first flange of larger diameter than both said first and second end portions located on said central portion of said shank, a head, a wrench-receiving portion on said head for receiving a wrench, a bore in said head for receiving said second end portion with a press fit, a second flange on said head, said second flange being of larger diameter than said wrench-receiving portion and located in contiguous relationship to said first flange, and knurl means between said bore in said head and said second portion of said shank.

3. A two-piece lug bolt as set forth in claim 2 wherein said knurl means comprises a first knurl in said bore and a second knurl on said second portion of said shank.

4. A two-piece lug bolt as set forth in claim 3 wherein said first flange is frustoconical and has a smaller base adjacent said first portion of said shank, and wherein said second flange flares outwardly from said wrench-receiving portion toward said first flange.

5. A two-piece lug bolt as set forth in claim 4 wherein said first and second flanges have substantially the same maximum diameter.

6. A two-piece lug bolt comprising a shank having first and second end portions and a central portion therebetween, a thread on said first end portion, a first flange of larger diameter than both said first and second end portions located on said central portion of said shank, a head, a wrench-receiving portion on said head for receiving a wrench, a bore in said head for receiving said second end portion with a press fit, a second flange on said head, said second flange being of larger diameter than said wrench-receiving portion and located in contiguous relationship to said first flange, said first flange terminating at a first flat annular surface, and said second flange terminating at a second flat annular surface which bears against said first flat annular surface.

7. A two-piece lug bolt as set forth in claim 6 wherein said first and second flat annular surfaces include portions which lie laterally outwardly of said wrench-receiving portion of said head.

8. A two-piece lug bolt as set forth in claim 6 including knurl means between said bore in said head and said second portion of said shank.

9. A two-piece lug bolt as set forth in claim 8 wherein said knurl means comprises a first knurl in said bore and a second knurl on said second portion of said shank.

10. A two-piece lug bolt as set forth in claim 9 wherein said first and second flat annular surfaces include portions which lie laterally outwardly of said wrench-receiving portion of said head.

11. A two-piece lug bolt as set forth in claim 10 wherein said first flange is frustoconical and has a smaller base adjacent said first portion of said shank, and wherein said second flange flares outwardly from said wrench-receiving portion toward said first flange.

12. A two-piece lug bolt as set forth in claim 11 wherein said first and second flanges have substantially the same maximum diameter.

* * * * *